United States Patent [19]
Gerszberg et al.

[11] Patent Number: 6,052,439
[45] Date of Patent: *Apr. 18, 2000

[54] NETWORK SERVER PLATFORM TELEPHONE DIRECTORY WHITE-YELLOW PAGE SERVICES

[75] Inventors: Irwin Gerszberg, Kendall Park; Kenny Xiaojian Huang, Somerset; Christopher K. Kwabi, Englewood; Jeffrey S. Martin, Dover, all of N.J.

[73] Assignee: AT&T Corp, New York, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 09/001,426

[22] Filed: Dec. 31, 1997

[51] Int. Cl.$^7$ ....................................................... H04M 1/64
[52] U.S. Cl. ........................................ 379/88.01; 379/216
[58] Field of Search ............................ 379/88.03, 88.01, 379/216, 213

[56] References Cited

U.S. PATENT DOCUMENTS

| | | |
|---|---|---|
| 4,456,925 | 6/1984 | Skerlos et al. . |
| 4,620,289 | 10/1986 | Chauvel . |
| 4,725,694 | 2/1988 | Auer et al. . |
| 4,916,441 | 4/1990 | Gombrich . |
| 5,014,267 | 5/1991 | Tompkins et al. . |
| 5,157,717 | 10/1992 | Hitchcock . |
| 5,335,276 | 8/1994 | Thompson et al. . |
| 5,393,964 | 2/1995 | Hamilton et al. . |
| 5,406,615 | 4/1995 | Miller, II et al. . |
| 5,479,488 | 12/1995 | Lennig et al. .................. 379/88.04 |
| 5,488,412 | 1/1996 | Majeti et al. . |
| 5,488,652 | 1/1996 | Bielby et al. .................. 379/88.03 |
| 5,512,935 | 4/1996 | Majeti et al. . |
| 5,534,913 | 7/1996 | Majeti et al. . |
| 5,546,316 | 8/1996 | Buckley et al. . |
| 5,561,604 | 10/1996 | Buckley et al. . |
| 5,572,005 | 11/1996 | Hamilton et al. . |
| 5,583,965 | 12/1996 | Douma et al. . |
| 5,584,054 | 12/1996 | Tyneski et al. . |
| 5,587,735 | 12/1996 | Ishida et al. . |
| 5,619,684 | 4/1997 | Goodwin et al. . |
| 5,644,628 | 7/1997 | Schwarzer et al. . |
| 5,671,267 | 9/1997 | August et al. . |
| 5,682,195 | 10/1997 | Hendricks et al. . |
| 5,684,918 | 11/1997 | Abecassis . |

*Primary Examiner*—Creighton Smith

[57] ABSTRACT

A local loop access network providing high-speed access at a committed data delivery rate and natural language processing of spoken directory assistance queries. A user's spoken natural language query is processed and a directory assistance database is searched at the network server platform based on the contents of the query. Search results are provided to the user either through an audio interface or as text on a screen. The user is provided with the option of obtaining more information about certain listings and may select a listing to be automatically dialed. Search results are prioritized based on any listings previously selected to be automatically dialed and based on the geographical proximity between the establishments in the results list and the address from which the directory assistance query was initiated.

23 Claims, 7 Drawing Sheets

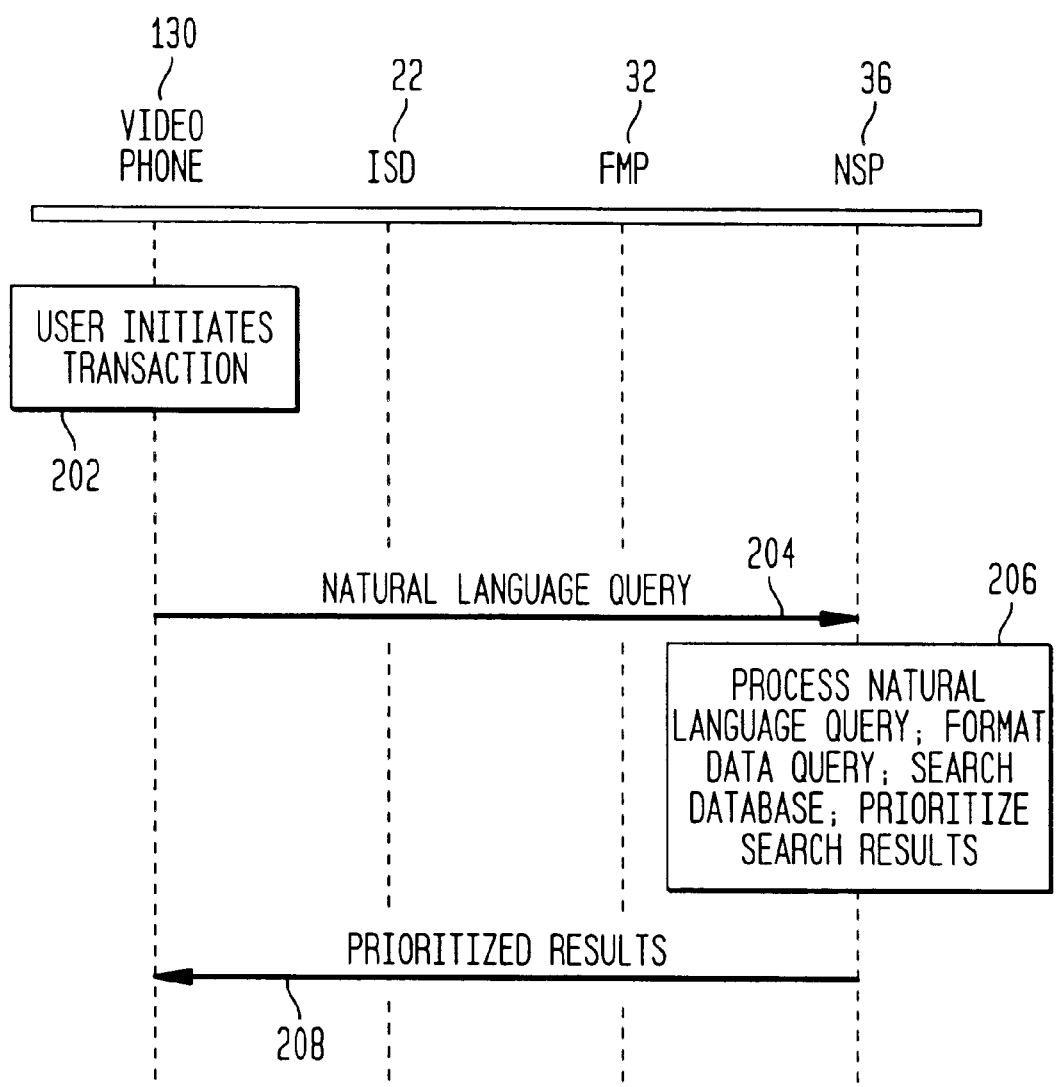

NETWORK SERVER PLATFORM TELEPHONE DIRECTORY WHITE-YELLOW PAGE SERVICES

FIELD OF THE INVENTION

This invention relates to providing automated directory assistance of telephone numbers over a local loop access architecture.

BACKGROUND

As deregulation of the telephone industry continues and as companies prepare to enter the local telephone access market, there is a need to offer new and innovative services that distinguish common carriers from their competitors. This cannot be accomplished without introducing new local access network architectures that will be able to support these new and innovative services.

Conventionally, customer premises telephone and/or data connections contain splitters for separating analog voice calls from other data services such as Ethernet transported over digital subscriber line (DSL) modems. Voice band data and voice signals are sent through a communications switch in a central or local office to an interexchange carrier or Internet service provider. DSL data is sent through a digital subscriber loop asynchronous mode (DSLAM) switch which may include a router. The DSLAM switch connects many lines and routes the digital data to a telephone company's digital switch.

A major problem with this configuration is that interexchange carriers attempting to penetrate the local telephone company's territory must lease trunk lines from the local telephone company switch to the interexchange company's network for digital traffic. Furthermore, the Internet service provider must lease a modem from the local phone company in the DSLAM switch and route its data through the local phone company's digital switch. Thus, the local phone company leases and/or provides a significant amount of equipment, driving up the cost of entry for any other company trying to provide local telephone services and making it difficult for the interexchange companies to differentiate their services. Furthermore, since DSL modem technology is not standardized, in order to ensure compatibility, the DSL modem provided by the local telephone company must also be provided to the end user in the customer premises equipment (CPE). Additionally, since the network is not completely controlled by the interexchange companies, it is difficult for the interexchange companies to provide data at committed delivery rates. Any performance improvements implemented by the interexchange companies may not be realized by their customers, because the capabilities of the local telephone company equipment may or may not meet their performance needs. Thus, it is difficult for the interexchange companies to convince potential customers to switch to their equipment or to use their services. These factors ensure the continued market presence of the local telephone company.

As part of this system, there is a need for improved architectures, services and equipment utilized to distinguish the interexchange companies' products and services. One such service is telephone listing directory assistance.

Techniques for searching telephone directory assistance databases and providing telephone number listings are well known in the prior art. Some of these techniques search based upon: the category of a business' products and/or services, the business's name, a person's last name or a person's last name and first name, and the distance from a certain address. A printout of certain pages from AT&T's Toll-Free Internet Directory, attached as Appendix A, provides an example of some of the services currently being provided by on-line directory assistance services. As is the case for any user connected to the Internet over a POTS connection, users of Internet-based telephone listing directory assistance services sometimes experience lengthy delays in receiving responses due to the asynchronous nature of data transfers over the Internet. Further, users must be computer and Internet literate to use such services. Therefore, there is a need for directory assistance services that are capable of interpreting spoken natural language directory assistance queries and that are capable of transferring data at a committed high-speed delivery rate.

SUMMARY OF THE INVENTION

In order to provide an improved network, it is desirable for the interexchange companies to have access to at least one of the twisted-pair lines or alternate wireless facility connecting each of the individual users to the local telephone network before the lines are routed through the conventional local telephone network equipment. It is preferable to have access to these lines prior to the splitter and modem technology offered by the local service providers. By having access to the twisted-pair wires entering the customer's premises, interexchange companies can differentiate their services by providing higher bandwidth, improving the capabilities of the customer premises equipment, and lowering overall system costs to the customer by providing competitive service alternatives.

The new architecture may utilize a video phone and/or other devices to provide new services to an end user; an intelligent services director (ISD) disposed near the customer's premises for multiplexing and coordinating many digital services onto a single twisted-pair line; a facilities management platform (FMP) disposed in the local telephone network's central office for routing data to an appropriate interexchange company network; and a network server platform (NSP) coupled to the FMP for providing new and innovative services to the customer and for distinguishing services provided by the interexchange companies from those services provided by the local telephone network.

As part of this system, in a preferred embodiment, a local loop access network provides high-speed access at a committed data delivery rate and natural language processing of spoken directory assistance queries. A user's spoken natural language query is processed and a directory assistance database is searched at the network server platform based on the contents of the query. Search results are provided to the user either through an audio interface or as text on a screen. The user is provided with the option of obtaining more information about certain listings and may select a listing to be automatically dialed. Search results are prioritized based on any listings previously selected to be automatically dialed and based on the geographical proximity between the establishments in the results list and the address from which the directory assistance query was initiated.

BRIEF DESCRIPTION OF THE DRAWINGS

The foregoing summary of the invention, as well as the following detailed description of preferred embodiments, is better understood when read in conjunction with the accompanying drawings, which are included by way of example, and not by way of limitation with regard to the claimed invention.

FIG. 5 illustrates a preferred embodiment with the network server platform hosting the directory assistance database.

DETAILED DESCRIPTION OF PREFERRED EMBODIMENTS

Figure 1:
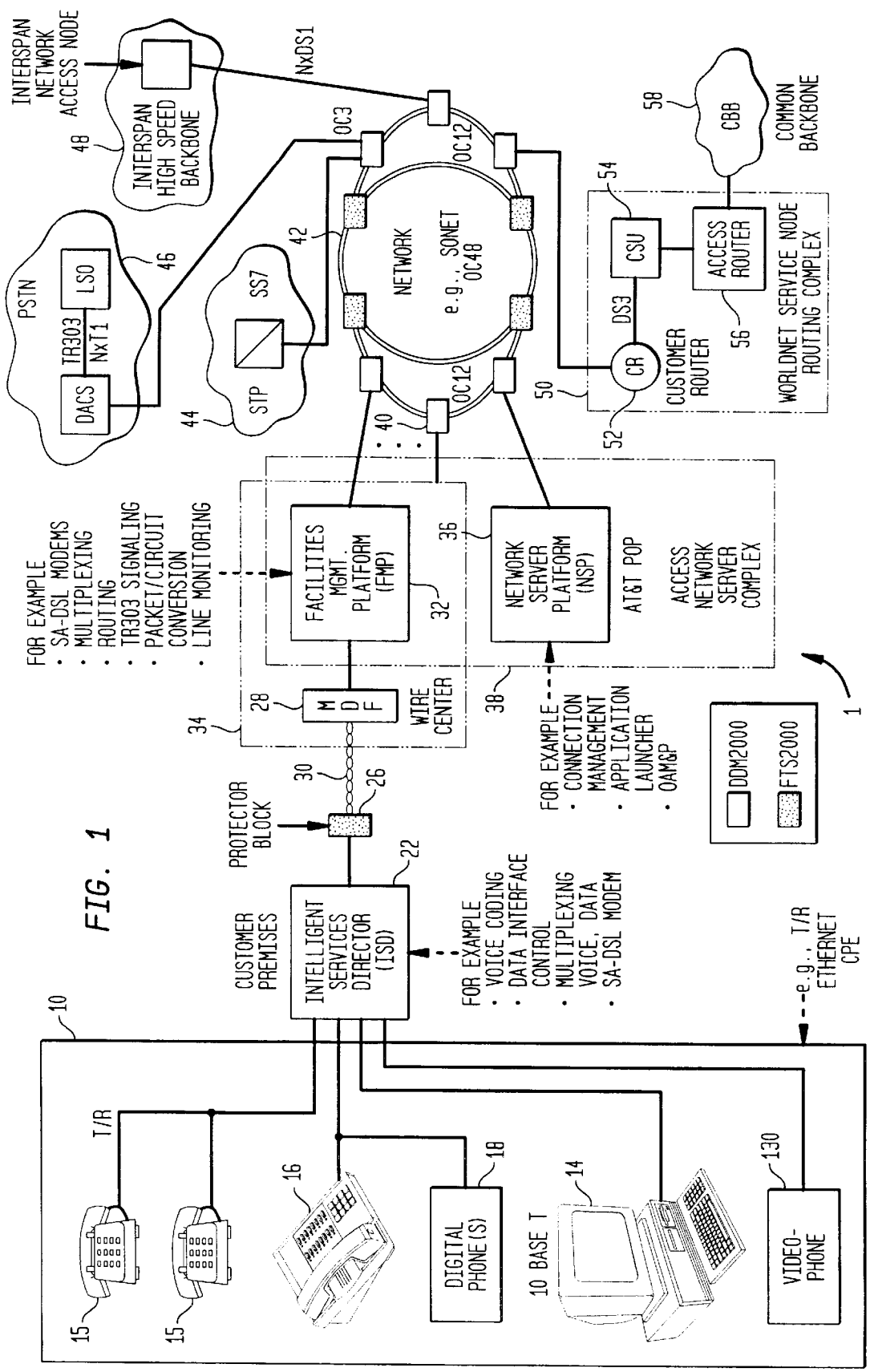
FIG. 1 illustrates an embodiment of a hybrid fiber twisted pair local loop architecture.

Referring to FIG. 1, a first exemplary communication network architecture employing a hybrid fiber, twisted-pair (HFTP) local loop 1 architecture is shown. An intelligent services director (ISD) 22 may be coupled to a central office 34 via a twisted-pair wire, hybrid fiber interconnection, wireless and/or other customer connection 30, a connector block 26, and/or a main distribution frame (MDF) 28. The ISD 22 and the central or local office 34 may communicate with each other using, for example, framed, time division, frequency-division, synchronous, asynchronous and/or spread spectrum formats, but in exemplary embodiments uses DSL modem technology. The central office 34 preferably includes a facilities management platform (FMP) 32 for processing data exchanged across the customer connection 30. The FMP 32 may be configured to separate the plain old telephone service (POTS) from the remainder of the data on the customer connection 30 using, for example, a tethered virtual radio channel (TVRC) modem (shown in FIG. 4A). The remaining data may be output to a high speed backbone network (e.g., a fiber-optic network) such as an asynchronous transfer mode (ATM) switching network. The analog POTS data may be output directly to a public switch telephone network (PSTN) 46, and/or it may be digitized, routed through the high speed backbone network, and then output to the PSTN 46.

The FMP 32 may process data and/or analog/digitized voice between customer premise equipment (CPE) 10 and any number of networks. For example, the FMP 32 may be interconnected with a synchronous optical network (SONET) 42 for interconnection to any number of additional networks such as an InterSpan backbone 48, the PSTN 46, a public switch switching network (e.g. call setup SS7-type network 44), and/or a network server platform (NSP) 36. Alternatively, the FMP 32 may be directly connected to any of these networks. One or more FMPs 32 may be connected directly to the high speed backbone network (e.g., direct fiber connection with the SONET network 42) or they may be linked via a trunk line (e.g., trunks 40 or 42) to one or more additional networks.

The NSP 36 may provide a massive cache storage for various information that may be provided across the SONET net 42 to the FMP 32 and out to the ISD 22. The NSP 36 and the FMP 32 may collectively define an access network server complex 38. The NSP 36 may be interconnected with multiple FMPs 32. Furthermore, each FMP 32 may interconnect with one or more ISDs 22. The NSP 36 may be located anywhere but is preferably located in a point-of-presence (POP) facility. The NSP 36 may further act as a gateway to, for example, any number of additional services.

The ISD 22 may be interconnected to various devices such as a video phone 130, other digital phones 18, set-top devices, computers, and/or other devices comprising the customer premise equipment 10. The customer premise equipment may individually or collectively serve as a local network computer at the customer site. Application applets may be downloaded from the NSP 36 into some or all of the individual devices within the customer premise equipment 10. Where applets are provided by the NSP 36, the programming of the applets may be updated such that the applets are continually configured to the latest software version by the interexchange carrier. In this way, the CPE 10 may be kept up to date by simply reloading updated applets. In addition, certain applets may be resident on any of the CPE 10. These resident applets may be periodically reinitialized by simply sending a request from, for example, a digital phone 18 and/or a video phone 130 to the FMP 32 and thereafter to the NSP 36 for reinitialization and downloading of new applets. To ensure widespread availability of the new features made possible by the present architecture, the customer premise equipment may be provided to end users either at a subsidized cost or given away for free, with the cost of the equipment being amortized over the services sold to the user through the equipment.

Figure 2:
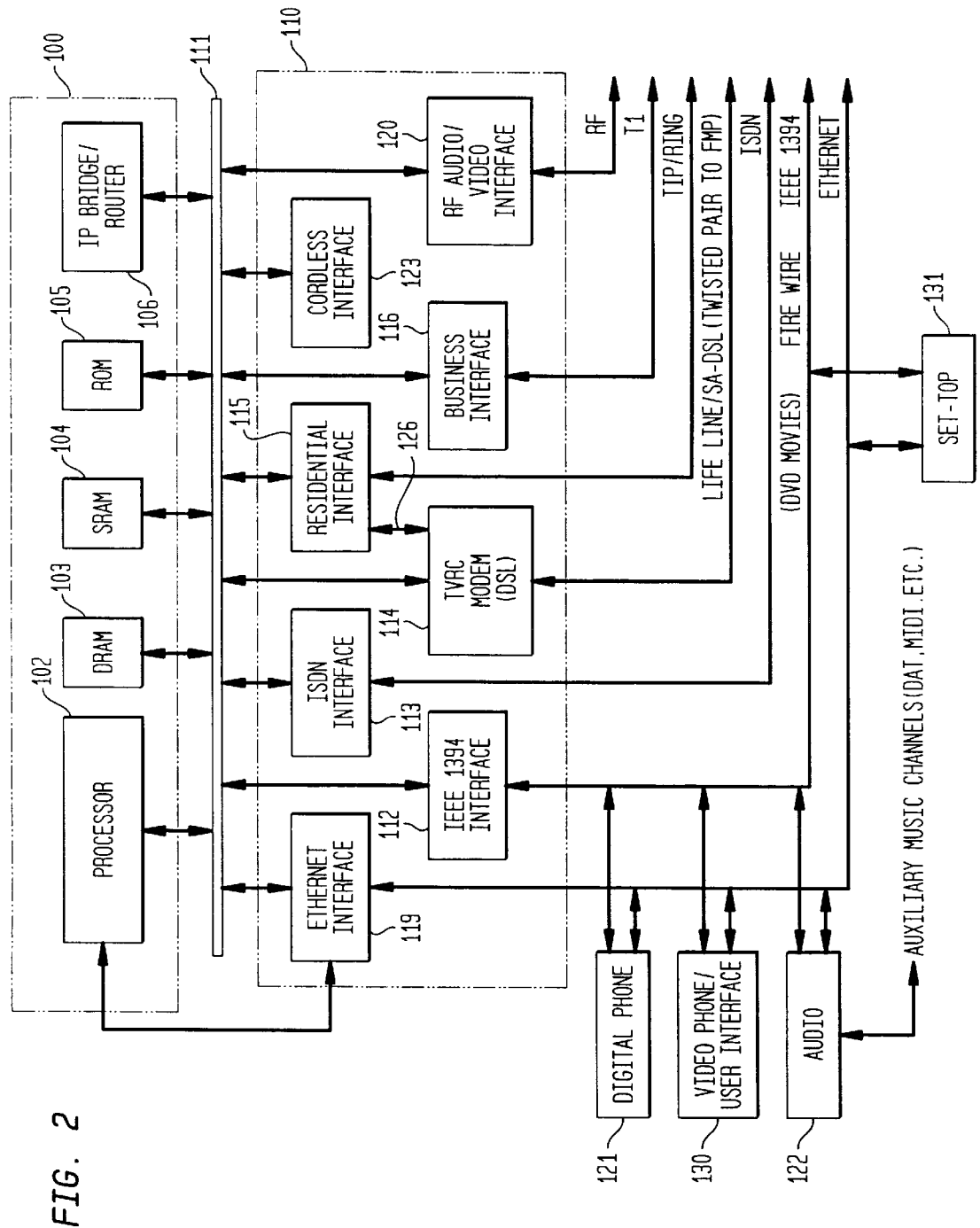
FIG. 2 is a block diagram of an embodiment of an intelligent services director consistent with the architecture shown in FIG. 1.

Referring to FIG. 2, the ISD 22 may connect with a variety of devices including analog and digital voice telephones 15, 18; digital video phones 130, devices for monitoring home security, meter reading devices (not shown), utilities devices/energy management facilities (not shown), facsimile devices 16, personal computers 14, and/or other digital or analog devices. Some or all of these devices may be connected with the ISD 22 via any suitable mechanism such as a single and/or multiple twisted-pair wires and/or a wireless connection. For example, a number of digital devices may be multi-dropped on a single twisted-pair connection. Similarly, analog phones and other analog devices may be multi-dropped using conventional techniques.

The ISD 22 may be located within the home/business or mounted exterior to the home/business. The ISD 22 may operate from electrical power supplied by the local or central office 34 and/or from the customer's power supplied by the customer's power company. Where the ISD 22 includes a modem, it may be desirable to power the ISD 22 with supplemental power from the home in order to provide sufficient power to enable the optimal operation of the modem.

As shown in FIG. 2, in some embodiments the ISD 22 may include a controller 100 which may have any of a variety of elements such as a central processing unit 102, a DRAM 103, an SRAM 104, a ROM 105 and/or an Internet protocol (IP) bridge router 106 connecting the controller 100 to a system bus 111. The system bus 111 may be connected with a variety of network interface devices 110. The network interface devices 110 may be variously configured to include an integrated services digital network (ISDN) interface 113, an Ethernet interface 119 (e.g., for 28.8 kbs data, 56 kbs data, or ISDN), an IEEE 1394 "fire wire" interface 112 (e.g., for a digital videodisc device (DVD)), a TVRC modem interface 114 (e.g., for a digital subscriber line (DSL) modem), a residential interface 114, (e.g., standard POTS phone systems such as tip ring), a business interface 116 (e.g., a T1 line and/or PABX interface), a radio frequency (RF) audio/video interface 120 (e.g., a cable television connection), and a cordless phone interface 123 (e.g., a 900 MHZ transceiver). Connected to one of the network interfaces and/or the system bus 111 may be any number of devices such as an audio interface 122 (e.g., for digital audio, digital telephones, digital audio tape (DAT) recorders/ players, music for restaurants, MIDI interface, DVD, etc.), a digital phone 121, a video phone/user interface 130, a television set-top device 131 and/or other devices. Where the network interface is utilized, it may be desirable to use, for example, the IEEE 1394 interface 112 and/or the Ethernet interface 119.

A lifeline 126 may be provided for continuous telephone service in the event of a power failure at the CPE 10. The lifeline 126 may be utilized to connect the ISD 22 to the local telecommunications company's central office 34 and, in particular, to the FMP 32 located in the central office 34.

The ISD may be variously configured to provide any number of suitable services. For example, the ISD 22 may offer high fidelity radio channels by allowing the user to select a particular channel and obtaining a digitized radio channel from a remote location and outputting the digital audio, for example, on audio interface 122, video phone 130, and/or digital phones 121. A digital telephone may be connected to the audio interface 122 such that a user may select any one of a number of digital audio service channels by simply having the user push a digital audio service channel button on the telephone and have the speaker phone output particular channels. The telephone may be preprogramed to provide the digital audio channels at a particular time, such as a wake up call for bedroom mounted telephone, or elsewhere in the house. The user may select any number of services on the video phone and/or other user interface such as a cable set-top device. These services may include any number of suitable services such as weather, headlines in the news, stock quotes, neighborhood community services information, ticket information, restaurant information, service directories (e.g., yellow pages), call conferencing, billing systems, mailing systems, coupons, advertisements, maps, classes, Internet, pay-per-view (PPV), and/or other services using any suitable user interface such as the audio interface 122, the video phone/user interface 130, digital phones, 121 and/or another suitable device such as a set top device 131.

In further embodiments, the ISD 22 may be configured as an IP proxy server such that each of the devices connected to the server utilizes transmission control protocol/Internet protocol (TCP/IP) protocol. This configuration allows any device associated with the ISD to access the Internet via an IP connection through the FMP 32. Where the ISD 22 is configured as an IP proxy server, it may accommodate additional devices that do not support the TCP/IP protocol. In this embodiment, the ISD 22 may have a proprietary or conventional interface connecting the ISD 22 to any associated device such as to the set top box 131, the personal computer 14, the video telephone 130, the digital telephone 18, and/or some other end user device.

In still further embodiments, the ISD 22 may be compatible with multicast broadcast services where multicast information is broadcast by a central location and/or other server on one of the networks connected to the FMP 32, e.g., an AIM-switched network. The ISD 22 may download the multicast information via the FMP 32 to any of the devices connected to the ISD 22. The ISD 22 and/or CPE 10 devices may selectively filter the information in accordance with a specific customer user's preferences. For example, one user may select all country music broadcasts on a particular day while another user may select financial information. The ISD 22 and/or any of the CPE 10 devices may also be programmed to store information representing users' preferences and/or the received uni-cast or multicast information in memory or other storage media for later replay. Thus, for example, video clips or movies may be multicast to all customers in the community with certain users being preconfigured to select the desired video clip/movie in real time for immediate viewing and/or into storage for later viewing.

Figure 3A:
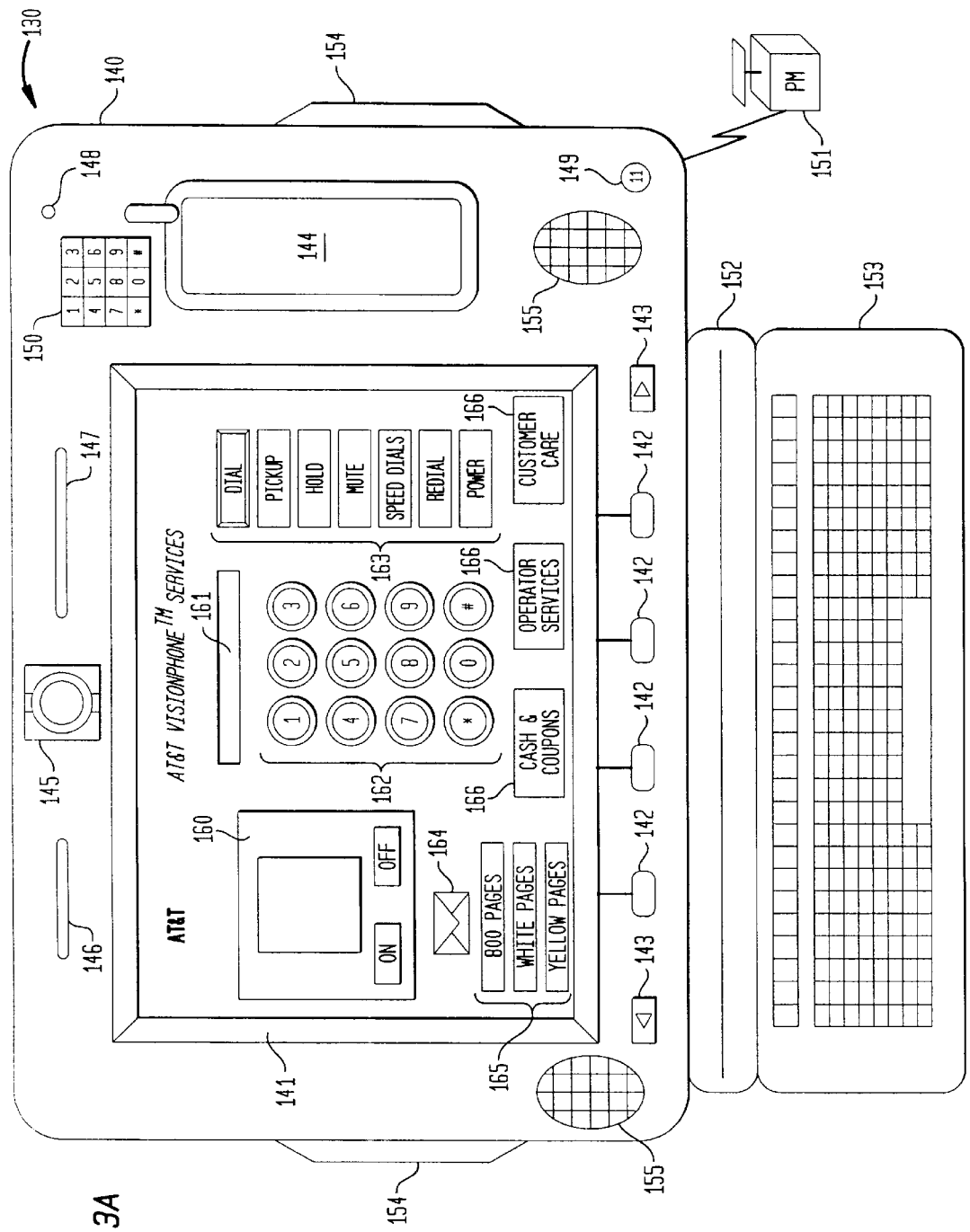
FIG. 3A and 3B illustrate an embodiment of a video phone consistent with the architecture shown in FIG. 1.
Figure 3B:
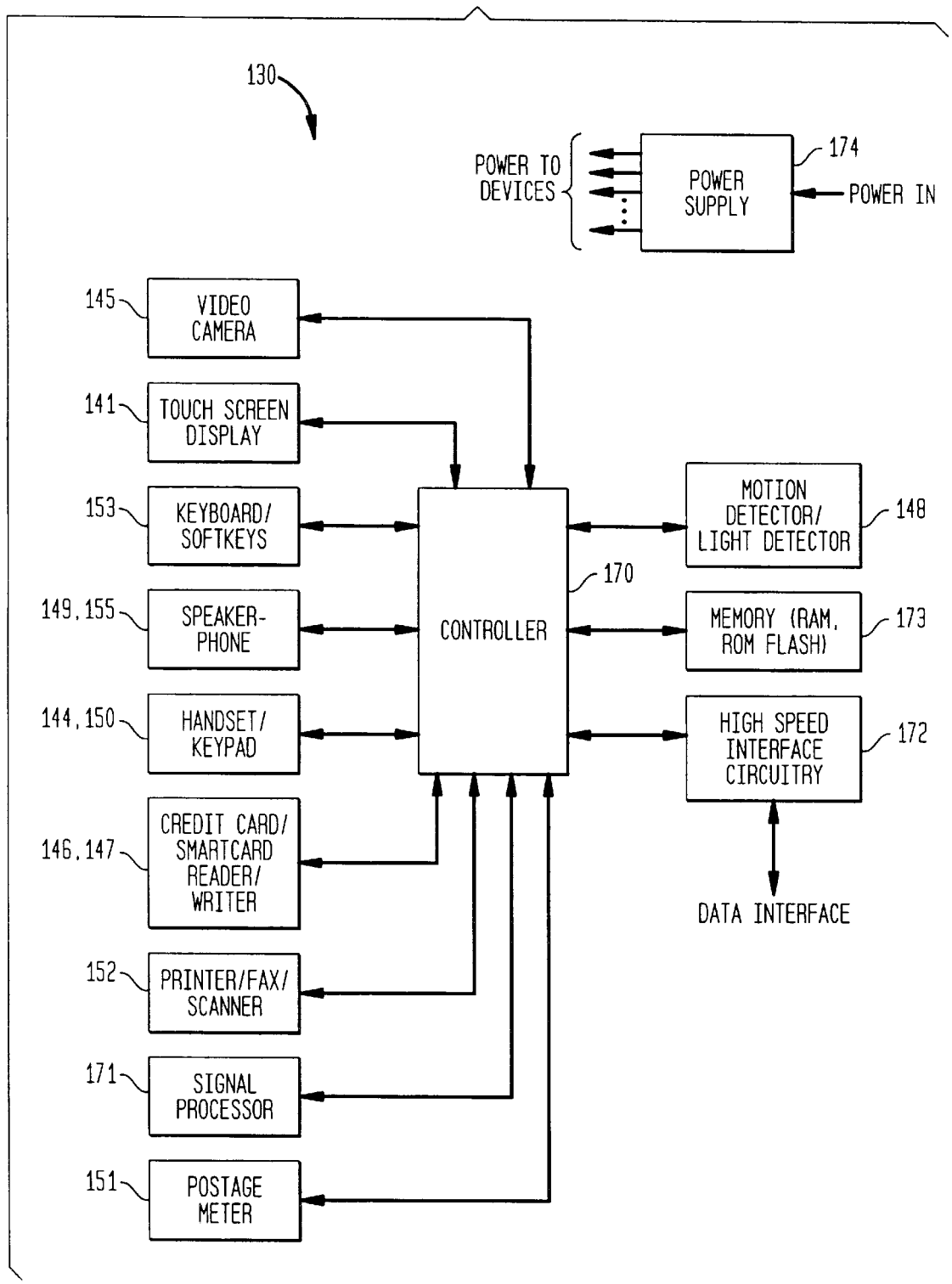

Referring to FIG. 3A, a video phone 130 may include a touch screen display 141 and soft keys 142 around the perimeter of the display 141. The display may be responsive to touch, pressure, and/or light input. Some or all of the soft keys 142 may be programmable and may vary in function depending upon, for example, the applet being run by the video phone 130. The function of each soft key may be displayed next to the key on the display 141. The functions of the soft keys 142 may also be manually changed by the user by pressing scroll buttons 143. The video phone 140 may also include a handset 144 (which may be connected via a cord or wireless connection to the rest of the video phone and/or directly to the ISD), a keypad 150, a video camera 145, a credit card reader 146, a smart card slot 147, a microphone 149, a motion and/or light detector 148, built-in speaker(s) 155, a printer/scanner/facsimile 152, and/or external speakers 154 (e.g., stereo speakers). A keyboard 153 and/or a postage scale 151 may also be connected to the video phone 130. Any or all of the above-mentioned items may be integrated with the video phone unit itself or may be physically separate from the video phone unit. A block diagram of the video phone unit is shown in FIG. 3B. Referring to FIG. 3B, in addition to the items above, the video phone 130 may also include a signal processor 171, high speed interface circuitry 172, memory 173, power supply 174, all interconnected via a controller 170.

When the video phone 130 is used as a video telephone, the display 141 may include one or more video window(s) 160 for viewing a person to whom a user is speaking and/or showing the picture seen by the person on the other end of the video phone. The display may also include a dialed-telephone-number window 161 for displaying the phone number dialed, a virtual keypad 162, virtual buttons 163 for performing various telephone functions, service directory icons 165, a mail icon 164, and/or various other service icons 166 which may be used, for example, for obtaining coupons or connecting with an operator. Any or all of these items may be displayed as virtual buttons and/or graphic icons and may be arranged in any combination. Additionally, any number of other display features may be shown on the video phone in accordance with one or more of the applications incorporated by reference below.

Figure 4A:
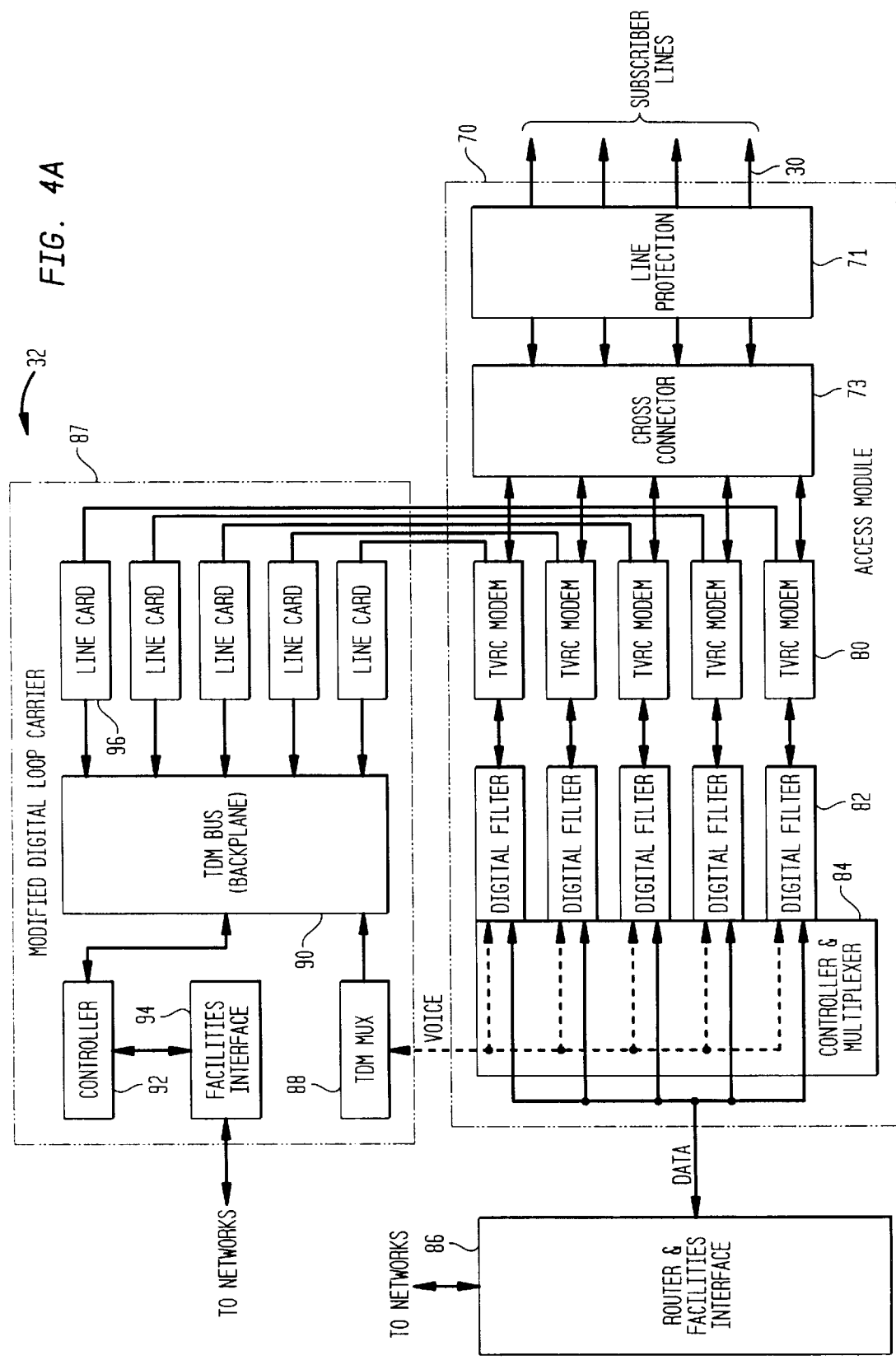
FIG. 4A is a block diagram of an embodiment of a facilities management platform consistent with the architecture shown in FIG. 1.

Referring to FIG. 4A, the FMP 32 may coordinate the flow of data packets, separate voice signals from other signals, perform line monitoring and switching functions, and/or convert between analog and digital signals. The FMP 32 may process data sent from the CPE 10 to the central or local office 34 by separating and reconstructing analog voice signals, data, and control frames. The FMP 32 may process data sent from the central or local office 34 to the CPE 10 by separating control messages from user information, and configure this information into segments that for transport across the digital subscriber loop. The FMP 32 may also terminate the link layer associated with the digital subscriber loop.

In some embodiments, the FMP 32 may include an access module 70 and a digital loop carrier 87. The access module 70 may include a line protector 71, a cross-connector 73, a plurality of TVRC modems 80, a plurality of digital filters 82, a controller multiplexer 84, and/or a router and facilities interface 86. The digital loop carrier 87 may include a plurality of line cards 96, a time domain multiplexing (IDM)

multiplexor (MUX) 88, a TDM bus 90, a controller 92, and/or a facilities interface 94.

During normal operations, digital signals on the customer connection 30 (e.g., twisted-pair lines) containing both voice and data may be received by the TVRC modems 80 via the line protector 71 and the cross-connector 73. Preferably, the line protector 71 includes lightning blocks for grounding power surges due to lightning or other stray voltage surges. The TVRC modems 80 may send the digital voice and/or data signals to the controller multiplexor 84 and the digital filters 82. The digital filters 82 may separate the voice signals from the digital data signals, and the controller multiplexor 84 may then multiplex the voice signals and/or data signals received from the digital filters 82. The controller multiplexor 84 may then send multiplexed voice signals to the TDM MUX 88 and the data signals to the router and facilities interface 86 for transmission to one or more external networks. The TDM MUX 88 may multiplex the voice signals from the controller multiplexor 84 and/or send the voice signals to the TDM bus 90, which may then send the digital voice signals to the controller 92 and then to the facilities interface 94 for transmission to one or more external networks. Both the router and facilities interface 86 and the facilities interface 94 may convert between electrical signals and optical signals when a fiber optic link is utilized.

When there is a failure of the digital data link (e.g., if there is a failure of the TVRC modems 80 at the FMP 32 or the TVRC modem 114 at the ISD 22), only analog voice signals might be sent over the subscriber lines 30. In such a case, the analog voice signals may be directly routed to the line cards 96, bypassing the TVRC modems 80, the digital filters 82, the controller multiplexor 84, and the TDM MUX 88. Thus, voice communication is ensured despite a failure of the digital data link. The line cards 96 may convert the analog voice signals into digital format (e.g., TDM format) and send the digitized voice data onto the TDM bus 90 and eventually through the controller 92 and the facilities interface 94 for transmission to one or more external networks.

Figure 4B:
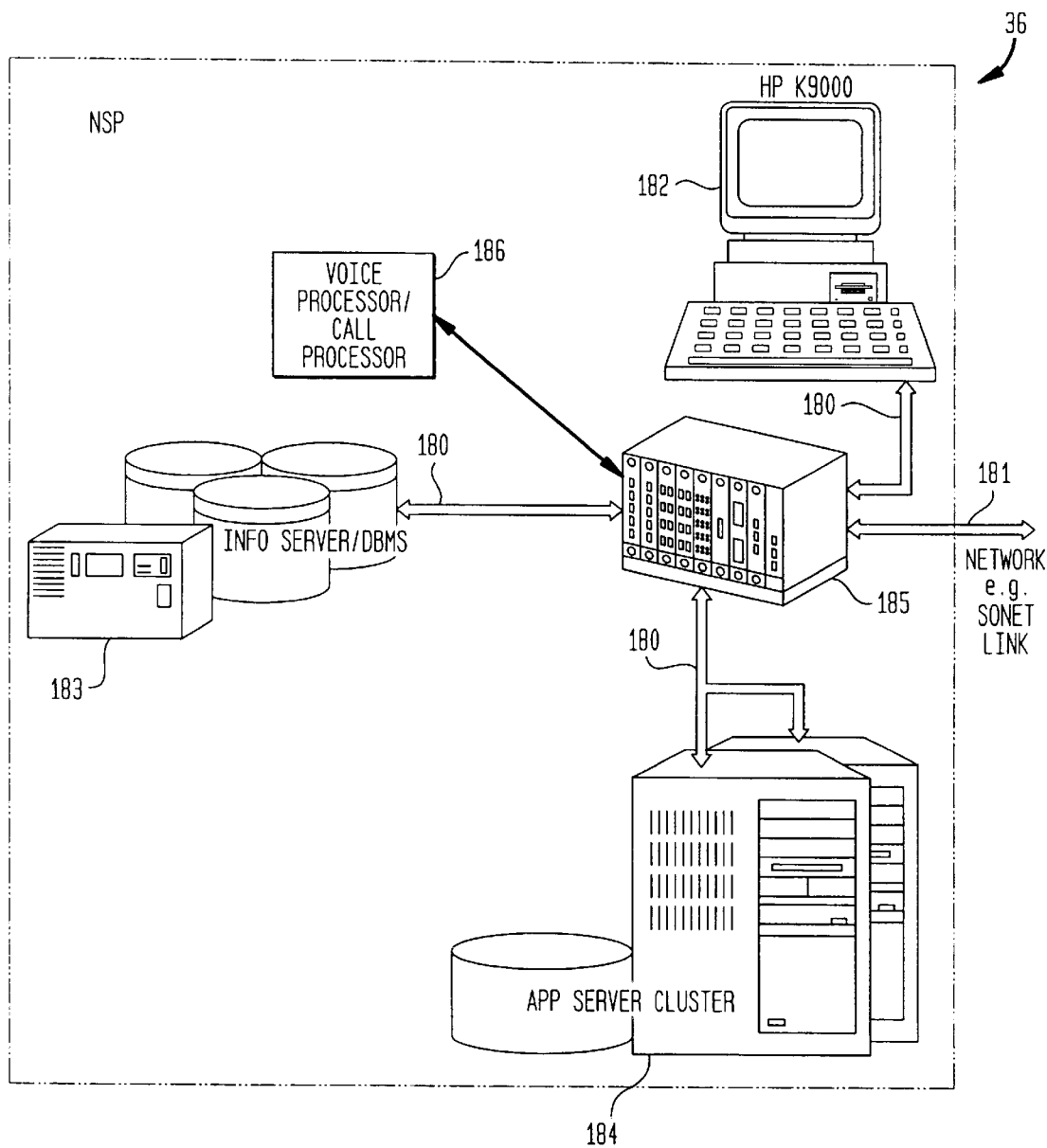
FIG. 4B illustrates a block diagram of an embodiment of a network server platform consistent with the architecture shown in FIG. 1.

Referring to FIG. 4B, the NSP 36 may be variously configured to provide any number of services provided by a server such as automated directory assistance services for telephone number listings, information services, Internet services, pay-per-view movie services, data-base services, commercial services, and/or other suitable services. In the embodiment shown in FIG. 4B, the NSP 36 includes a router 185 having a backbone 180 (e.g., a fiber distributed data interface (FDDI) backbone) that interconnects a management server 182, an information/database server 183, and/or one or more application server clusters 184. The NSP 36 may be connected via the router 185 by a link 181 to one or more external networks, NSPs 36, and/or an FMPs 32. The information/data base server 183 may perform storage and/or database functions. The application server cluster 184 may maintain and control the downloading of applets to the ISD 22. The NSP 36 may also include a voice/call processor 186 configured to handle call and data routing functions, set-up functions, distributed operating system functions, voice recognition functions for spoken commands input from any of the ISD connected devices as well as other functions, including natural language processing of spoken directory assistance queries.

In a preferred embodiment, a user initiates a directory assistance transaction by pressing a soft-key 165 on the vision phone/user interface 130. Then the user may verbally enter a directory assistance query, such as "look up Tom Jones," as shown at 202. This query is transmitted from the video phone 130 through the ISD 22 and over the customer connection 30 to the FMP 32, then over the SONET 42 to the NSP 36, as shown at 204. The NSP 36 then processes the natural language query, incorporates the street address from which the directory assistance query was initiated, searches the database, and prioritizes the search results, as described in more detail below and as depicted at 206.

Natural language processing and speech recognition techniques, which are well known in the prior art, are performed by the voice processor 186. The NSP 36 contains an information server as shown with reference number 183 in FIG. 4b. The information server 183 contains electronic memory or other appropriate storage media such as magnetic or optical disks on which the directory assistance database is stored. The information server 183 also contains a suitably programmed processor or other appropriate software that function as a search engine or other means for searching the directory assistance database.

The search results are sent from the NSP 36 over the SONET 42, through the FMP 32, and then from the FMP 32, over the customer connection 30, to the ISD 22, as shown at 208. The results are displayed on the video phone user interface 130 as text, or the results are provided through the video phone's audio interface, depending upon the mode selected by the user.

Options for obtaining more information about yellow pages and toll-free directory pages are provided to the user. That additional information could include additional information about a company's products and/or services and a web link to a company's web page. The additional information is stored on the information server 183. The user is provided with the option of selection a listing from the search results to be automatically dialed. If a result is selected by the user for automatic dialing, then that listing is saved by the information server 183 so that future search results can be prioritized based on which listings have been previously selected from a particular video phone 130. Search results are also prioritized based upon the geographic proximity between the address from which the query was initiated and the locations of the establishments for which a listing appears in the search results. The address from which the directory assistance query was initiated is determined by examining the caller I.D. information and the source address of the data packets received at the NSP 36. The phone company's billing data is then cross-referenced to determine the street address, physical address, and/or geographical location from which the directory assistance query was initiated.

It will be obvious to those having ordinary skill in the art that certain functions, such as the natural language processing of verbal queries, storing selected numbers to be called by a particular user in memory, appending the user's address and other information, formatting the database query, and the like, all of which are well known in the art, may be performed at locations other than where they are performed in this preferred embodiment without departing from the scope of this invention.

For instance, in another preferred embodiment, shown in FIG. 6, the processing of the natural language directory assistance queries is performed at the NSP 36 and the database and search engine are located on a remote computer or server 236 coupled to the SONET 42. If the remote computer hosts the only instance of the database, then the database is referred to as centrally located. A centrally located database has the advantage of always being automatically updated when listings change. As in FIG. 5, before the subject invention handles a directory assistance query from a user, the address of the server or computer system hosting the directory assistance database and the user's street address, city, and zip code are initialized at the ISD 22, as shown at 220. Such configuration could occur at the FMP 32 or NSP 36 without departing from the scope of this invention.

The following applications, filed concurrently herewith, are hereby incorporated by reference:

1. A Hybrid Fiber Twisted-pair Local Loop Network Service Architecture (Gerszberg 41-3-13); U.S. application Ser. No. 09/001,425, filed Dec. 31, 1997,
2. Dynamic Bandwidth Allocation for use in the Hybrid Fiber Twisted-pair Local Loop Network Service Architecture (Gerszberg 42-4-14); U.S. application Ser. No. 09/001,425, filed Dec. 31, 1997.
3. The VideoPhone (Gerszberg 43-9-2); U.S. application Ser. No. 09/001,905, filed Dec. 31, 1997.
4. VideoPhone Privacy Activator (Gerszberg 44-10-3); U.S. application Ser. No. 09/001,909, filed Dec. 31, 1997.
5. VideoPhone Form Factor (Gerszberg 45-11-4); U.S. application Ser. No. 09/001,583 filed Dec. 31, 1997.
6. VideoPhone Centrally Controlled User Interface With User Selectable Options (Gerszberg 46-12-5); U.S. application Ser. No. 09/001,576, filed Dec. 31, 1997.
7. VideoPhone User Interface Having Multiple Menu Hierarchies (Gerszberg 47-13-6); U.S. application Ser. No. 09/001,908, filed Dec. 31, 1997.
8. VideoPhone Blocker (Gerszberg 79-38-26); U.S. application Ser. No. 09/001,353, filed Dec. 31, 1997.
9. VideoPhone Inter-com For Extension Phones (Gerszberg 48-14-7); U.S. application Ser. No. 09/001,358, filed Dec. 31, 1997.
10. Advertising Screen Saver (53-17); U.S. application Ser. No. 09/001,574, filed Dec. 31, 1997.
11. VideoPhone FlexiView Advertising (Gerszberg 49-15-8); U.S. application Ser. No. 09/001,579, filed Dec. 31, 1997.
12. VideoPhone Multimedia Announcement Answering Machine (Gerszberg 73-32-20); U.S. application Ser. No. 09/001,911, filed Dec. 31, 1997.
13. VideoPhone Multimedia Announcement Message Toolkit (Gerszberg 74-33-21); U.S. application Ser. No. 09/001,345, filed Dec. 31, 1997.
14. VideoPhone Multimedia Video Message Reception (Gerszberg 75-34-22); U.S. application Ser. No. 09/001,362, filed Dec. 31, 1997.
15. VideoPhone Multimedia Interactive Corporate Menu Answering Machine Announcement (Gerszberg 76-35-23); U.S. application Ser. No. 09/001,575, filed Dec. 31, 1997.
16. VideoPhone Multimedia Interactive On-Hold Information Menus (Gerszberg 77-36-24); U.S. application Ser. No. 09/001,356, filed Dec. 31, 1997.
17. VideoPhone Advertisement When Calling Video Non-enabled VideoPhone Users (Gerszberg 78-37-25); U.S. application Ser. No. 09/001,361, filed Dec. 31, 1997.
18. Motion Detection Advertising (Gerszberg 54-18-10); U.S. application Ser. No. 09/001,355, filed Dec. 31, 1997.
19. Interactive Commercials (Gerszberg 55-19); U.S. application Ser. No. 09/001,578, filed Dec. 31, 1997.
20. VideoPhone Electronic Catalogue Service (Gerszberg 50-16-9); U.S. application Ser. No. 09/001,421, filed Dec. 31, 1997.
21. A Facilities Management Platform For Hybrid Fiber Twisted-pair Local Loop Network, Service Architecture (Barzegar 18-56-17); U.S. application Ser. No. 09/001,422, filed Dec. 31, 1997.
22. Multiple Service Access on Single Twisted-pair (Barzegar (16-51-15); U.S. application Ser. No. 09/001,343, filed Dec. 31, 1997.
23. Life Line Support for Multiple Service Access on Single Twisted-pair (Barzegar 17-52-16); U.S. application Ser. No. 09/001,393, filed Dec. 31, 1997.
24. A Network Server Platform (NSP) For a Hybrid Fiber Twisted-pair (HFTP) Local Loop Network Service Architecture (Gerszberg 57-4-2-2-4); U.S. application Ser. No. 09/001,582, filed Dec. 31, 1997.
25. A Communication Server Apparatus For Interactive Commercial Service (Gerszberg 58-20-11); U.S. application Ser. No. 09/001,344, filed Dec. 31, 1997.
26. NSP Multicast, PPV Server (Gerszberg 59-21-12); U.S. application Ser. No. 09/001,580, filed Dec. 31, 1997.
27. NSP Internet, JAVA Server and VideoPhone Application Server (Gerszberg 60-5-3-22-18); U.S. application Ser. No. 09/001,359, filed Dec. 31, 1997.
28. NSP WAN Interconnectivity Services for Corporate Telecommuters (Gerszberg 71-9-7-4-21-6); U.S. application Ser. No. 09/001,540, filed Dec. 31, 1997.
29. NSP Telephone Directory White-Yellow Page Services (Gerszberg 61-6-4-23-19); U.S. application Ser. No. 09/001,426, filed Dec. 31, 1997.
30. NSP Integrated Billing System For NSP services and Telephone services (Gerszberg 62-7-5-24-20); U.S. application Ser. No. 09/001,359, filed Dec. 31, 1997.
31. Network Server Platform/Facility Management Platform Caching Server (Gerszberg 63-8-6-3-5); U.S. application Ser. No. 09/001,419, filed Dec. 31, 1997.
32. An Integrated Services Director (ISD) For HFTP Local Loop Network Service Architecture (Gerszberg 72-36-22-12); U.S. application Ser. No. 09/001,417, filed Dec. 31, 1997.
33. ISD and VideoPhone Customer Premise Network (Gerszberg 64-25-34-13-5); U.S. application Ser. No. 09/001,418, filed Dec. 31, 1997.
34. ISD Wireless Network (Gerszberg 65-26-35-14-6); U.S. application Ser. No. 09/001,363, filed Dec. 31, 1997.
35. ISD Controlled Set-Top Box (Gerszberg 66-27-15-7); U.S. application Ser. No. 09/001,424, filed Dec. 31, 1997.
36. Integrated Remote Control and Phone (Gerszberg 67-28-16-8); U.S. application Ser. No. 09/001,423, filed Dec. 31, 1997.
37. Integrated Remote Control and Phone User Interface (Gerszberg 68-29-17-9); U.S. application Ser. No. 09/001,420, filed Dec. 31, 1997.
38. Integrated Remote Control and Phone Form Factor (Gerszberg 69-30-18-10); U.S. application Ser. No. 09/001,420, filed Dec. 31, 1997.
39. VideoPhone Mail Machine (Attorney Docket No. 3493.73170); U.S. Provisional application Ser. No. 60/070104.
40. Restaurant Ordering Via VideoPhone (Attorney Docket No. 3493.73171); U.S. Provisional application Ser. No. 60/070121.
41. Ticket Ordering Via VideoPhone (Attorney Docket No. 3493.73712); U.S. Provisional application Ser. No. 60/070103.

42. Multi-Channel Parallel/Serial Concatenated Convolutional Codes And Trellis Coded Modulation Encode/Decoder (Gelblum 4-3); U.S. application Ser. No. 09/001,342, filed Dec. 31, 1997.

43. Spread Spectrum Bit Allocation Algorithm (Shively 19-2); U.S. application Ser. No. 09/001,842, filed Dec. 31, 1997.

44. Digital Channelizer With Arbitrary Output Frequency (Helms 5-3); U.S. application Ser. No. 09/001,581, filed Dec. 31, 1997.

45. Method And Apparatus For Allocating Data Via Discrete Multiple Tones (filed Dec. 22, 1997, Attorney Docket No. 3493.20096-Sankaranarayanan 1-1); U.S. application Ser. No. 08/997,167, filed Dec. 23, 1997.

46. Method And Apparatus For Reducing Near-End Cross Talk In Discrete Multi-Tone Modulators/Demodulators (filed Dec. 22, 1997, Attorney Docket No. 3493.37219-Helms 4-32-18). U.S. application Ser. No. 08/997,176, filed Dec. 23, 1997.

This application is number 29 in the list above.

In addition, the following two patent applications are hereby incorporated by reference:

1. U.S. patent application No. 08/943,312 filed Oct. 14, 1997 entitled Wideband Communication System for the Home, to Robert R. Miller, II and Jesse E. Russell, and 2. U.S. patent application No. 08/858,170, filed May 14, 1997, entitled Wide Band Transmission Through Wire, to Robert R. Miller, II, Jesse E. Russell and Richard R. Shively.

While exemplary systems and methods embodying the present invention are shown by way of example, it will be understood, of course, that the invention is not limited to these embodiments. Modifications may be made by those skilled in the art, particularly in light of the foregoing teachings. For example, each of the elements of the aforementioned embodiments may be utilized alone or in combination with elements of the other embodiments.

We claim:

1. A method of providing automated telephone directory assistance comprising, in combination:
   a. inputting a directory assistance query to a telecommunications device;
   b. transmitting said directory assistance query to a computerized directory assistance server over a local loop network;
   c. searching a directory assistance database based on at least said directory assistance query;
   d. transmitting the results of said directory assistance database search over said local loop network from said directory assistance server to said telecommunication device; and
   e. presenting a plurality of directory assistance listings to a directory assistance caller, said listings including said results of said directory assistance database search sorted based upon the geographic proximity of each listed establishment to the location from which said query originated.

2. The method of claim 1 wherein a user may select to receive additional information about any listings for which more information is available.

3. The method of claim 2 wherein said additional information is selected from the group consisting of: information about a company's products, information about a company's services, and a link to a company's web page.

4. The method of claim 1 wherein a user may select a listing to be called automatically.

5. The method of claim 4 wherein, upon selecting a listing to be called, said listing is stored with other listings selected from said telecommunication device.

6. The method of claim 5 wherein said stored selected numbers are used to prioritize said results of said directory assistance database search.

7. The method of claim 1 wherein said directory assistance query is entered verbally.

8. The method of claim 7 wherein said directory assistance query is entered in natural language.

9. An apparatus for providing automated telephone directory assistance comprising, in combination:
   a. means for receiving a directory assistance query input to a telecommunication device;
   b. means for transmitting said directory assistance query to a computerized directory assistance server over a local loop network;
   c. means for searching a directory assistance database based on at least said directory assistance query;
   d. means for transmitting the results of said directory assistance database search over said local loop network from said directory assistance server to said telecommunication device; and
   e. means for presenting a plurality of directory assistance listings to a directory assistance caller, said listings including said results of said directory assistance database search prioritized based upon the geographic proximity of the location of the listed establishments to the address from which said query was input.

10. The apparatus of claim 9 further comprising, in combination, means for providing a user the option of selecting to receive additional information about any listings for which more information is available.

11. The apparatus of claim 9 wherein said additional information is selected from the group consisting of: information about a company's products, information about a company's services, and a link to a company's web page.

12. The apparatus of claim 9 further comprising, in combination, means for providing a user with the option of selecting a listing to be called automatically.

13. The apparatus of claim 12 further comprising, in combination, means for saving said listings selected to be called from said telecommunications device.

14. The apparatus of claim 13 further comprising, in combination, means for prioritizing said results of said directory assistance database search based upon said saved listings selected to be called from said telecommunications device.

15. The apparatus of claim 9 further comprising, in combination, means for processing a verbally entered directory assistance query.

16. The apparatus of claim 15 further comprising, in combination, means for processing a directory assistance query entered in natural language.

17. An apparatus for providing automated telephone directory assistance comprising, in combination:
   a. a telecommunication device for receiving a directory assistance query;
   b. an intelligent services director coupled to said telecommunication device;
   c. a facilities management platform coupled to said intelligent services director;
   d. a network server platform coupled to said facilities management platform via a local loop network, said network server platform including, at least i. a telephone directory assistance database;
ii. a processor for searching said directory assistance database based upon said directory assistance query;
iii. means for transmitting the results of said directory assistance database search to said telecommunication device; and
iv. means for presenting a plurality of directory assistance listings to a directory assistance caller, said listings including said search results prioritized based on the geographic proximity between the establishments found by said search and the address from which the directory assistance query was initiated.

18. The apparatus of claim 17 wherein said network server platform further contains at least means for providing a user with the option of selecting a search result to be automatically called.

19. The apparatus of claim 18 wherein said network server platform further contains at least means for prioritizing said search results based on any previous search results which were selected to be called from the telecommunication device from which the directory assistance query was initiated.

20. The apparatus of claim 17 wherein said telecommunication device is selected from the group consisting of: a video phone, a personal computer, a digital telephone, and a set-top device.

21. The apparatus of claim 17 wherein said network server platform is coupled to said facilities management platform via a synchronous optical network.

22. The apparatus of claim 21 wherein said facilities management platform is coupled to said intelligent services director via a twisted pair wire.

23. The apparatus of claim 22 wherein data is transferred between said telecommunication device and said network server platform at a committed delivery rate.

* * * * *